(12) United States Patent
Oboodi et al.

(10) Patent No.: US 11,370,717 B2
(45) Date of Patent: Jun. 28, 2022

(54) PROTECTIVE COATING SYSTEMS FOR GAS TURBINE ENGINE APPLICATIONS

(71) Applicant: HONEYWELL INTERNATIONAL INC., Morris Plains, NJ (US)

(72) Inventors: Reza Oboodi, Morris Plains, NJ (US); Eric Passman, Piscataway, NJ (US); Bahram Jadidian, Watchung, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 1 day.

(21) Appl. No.: 16/811,726

(22) Filed: Mar. 6, 2020

(65) Prior Publication Data

US 2020/0207672 A1    Jul. 2, 2020

Related U.S. Application Data

(63) Continuation of application No. 14/156,502, filed on Jan. 16, 2014.

(51) Int. Cl.
*C04B 41/52* (2006.01)
*F01D 5/28* (2006.01)
(Continued)

(52) U.S. Cl.
CPC ............ *C04B 41/52* (2013.01); *C04B 41/009* (2013.01); *C04B 41/89* (2013.01); *F01D 5/282* (2013.01);
(Continued)

(58) Field of Classification Search
CPC ....... C04B 41/009; C04B 41/52; C04B 41/89; F01D 5/282; F01D 5/284; F01D 5/288; F05D 2300/2261; F05D 2300/6033; Y02T 50/672; Y10T 428/24364; Y10T 428/24612; Y10T 428/249955; Y10T 428/24999; Y10T 428/26
See application file for complete search history.

(56) References Cited

U.S. PATENT DOCUMENTS 5,102,698 A    4/1992   Cavalier et al.
5,156,912 A   10/1992   Lukco et al.
(Continued)

OTHER PUBLICATIONS

Ishikawa et al. "A Tough, Thermally Conductive Silicon Carbide Composite with High Strength up to 1600C in Air" Science vol. 282 pp. 1295-1297 (Year: 1998).*

*Primary Examiner* — Frank J Vineis
*Assistant Examiner* — Laura B Figg
(74) *Attorney, Agent, or Firm* — Lorenz & Kopf, LLP

(57) ABSTRACT

A protective coating system includes a substrate that has an exterior surface exhibiting a degree of valley/hill surface irregularity including a plurality of hills and a plurality of valleys and a first coating layer formed directly on to the exterior surface of the substrate and that conforms to the exterior surface of the substrate such that the first coating layer has a non-uniform coating thickness over the substrate. The protective coating system further includes a second coating layer formed directly on to the exterior surface of the first coating layer. The second coating layer includes a plurality of pores within the second coating layer. Still further, the protective coating system includes a third coating layer formed within at least some of the plurality of pores within the second coating layer.

18 Claims, 3 Drawing Sheets

(51) Int. Cl.
*C04B 41/89* (2006.01)
*C04B 41/00* (2006.01)
*B05D 7/00* (2006.01)
*B05D 5/12* (2006.01)
*B05D 5/10* (2006.01)

(52) U.S. Cl.
CPC ............ *F01D 5/284* (2013.01); *F01D 5/288* (2013.01); *B05D 5/10* (2013.01); *B05D 5/12* (2013.01); *B05D 7/5783* (2013.01); *B05D 2203/30* (2013.01); *F05D 2300/2261* (2013.01); *F05D 2300/6033* (2013.01); *Y02T 50/60* (2013.01); *Y10T 428/24364* (2015.01); *Y10T 428/24612* (2015.01); *Y10T 428/24999* (2015.04); *Y10T 428/249955* (2015.04); *Y10T 428/26* (2015.01)

(56) References Cited

U.S. PATENT DOCUMENTS

| | | | |
|---|---|---|---|
| 5,332,619 A | 7/1994 | Lacoste et al. | |
| 5,866,271 A | 2/1999 | Stueber et al. | |
| 6,579,636 B2 | 6/2003 | Oguri et al. | |
| 7,323,247 B2 | 1/2008 | Raybould et al. | |
| 8,137,802 B1 | 3/2012 | Loehman et al. | |
| 2002/0164430 A1 | 11/2002 | Heimberg et al. | |
| 2003/0003328 A1* | 1/2003 | Spitsberg | C04B 41/009 428/698 |
| 2005/0112381 A1 | 5/2005 | Raybould et al. | |
| 2005/0191516 A1 | 9/2005 | Nagaraj et al. | |
| 2005/0249602 A1 | 11/2005 | Freling et al. | |
| 2006/0121295 A1 | 6/2006 | Boutwell et al. | |
| 2008/0081214 A1 | 4/2008 | Narita et al. | |
| 2009/0017260 A1* | 1/2009 | Kulkarni | C23C 28/36 428/161 |
| 2009/0173050 A1 | 7/2009 | Travitzky et al. | |
| 2009/0178413 A1 | 7/2009 | Lee | |
| 2009/0239061 A1 | 9/2009 | Hazel et al. | |
| 2009/0324989 A1 | 12/2009 | Witz et al. | |
| 2010/0129636 A1 | 5/2010 | Cybulsky et al. | |
| 2010/0129673 A1 | 5/2010 | Lee | |
| 2010/0248929 A1 | 9/2010 | Bryden | |
| 2010/0255260 A1* | 10/2010 | Lee | C04B 41/52 428/164 |
| 2011/0027467 A1 | 2/2011 | Kirby et al. | |
| 2011/0171488 A1 | 7/2011 | Taylor | |
| 2012/0328886 A1 | 12/2012 | Schmidt et al. | |
| 2013/0004309 A1 | 1/2013 | Sambasivan et al. | |
| 2013/0089705 A1 | 4/2013 | Matsunaga et al. | |
| 2013/0136915 A1 | 5/2013 | Naik | |
| 2013/0189531 A1 | 7/2013 | Lee | |

* cited by examiner

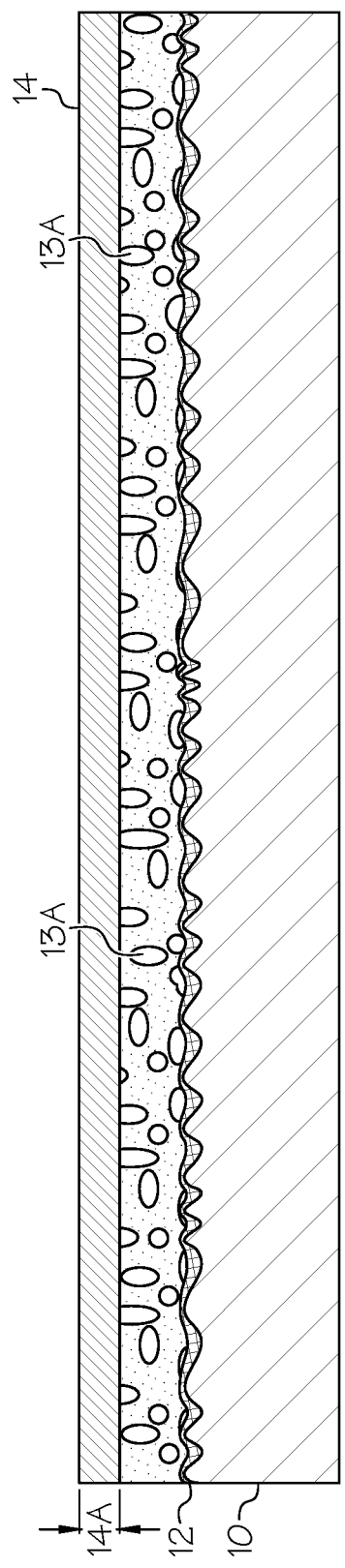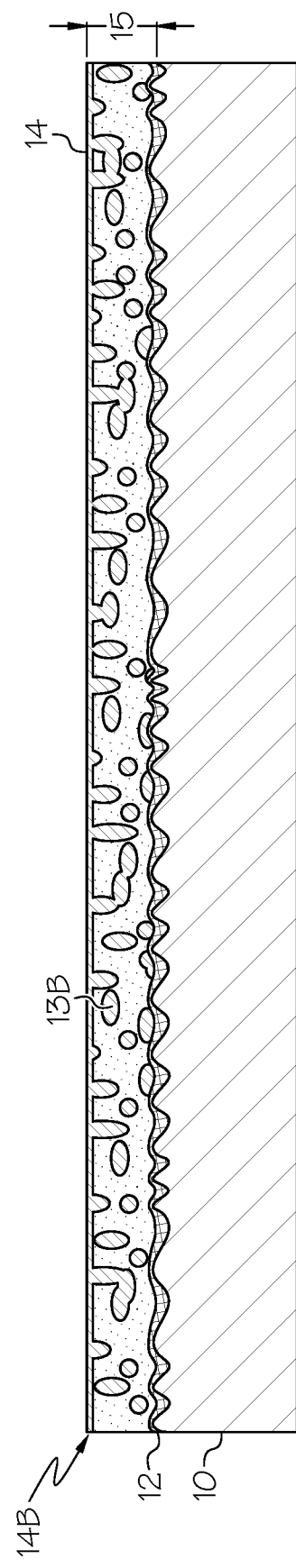

PROTECTIVE COATING SYSTEMS FOR GAS TURBINE ENGINE APPLICATIONS

CROSS-REFERENCE TO RELATED APPLICATIONS

The present application is a Continuation of U.S. patent application Ser. No. 14/156,502, filed on Jan. 16, 2014, the contents of which are herein incorporated by reference in their entirety.

TECHNICAL FIELD

The present disclosure generally relates to coatings for gas turbine engine applications.

BACKGROUND

Turbine engines are used as the primary power source for various kinds of aircraft and other vehicles. The engines may also serve as auxiliary power sources that drive air compressors, hydraulic pumps, and industrial electrical power generators. Most turbine engines generally follow the same basic power generation procedure. Compressed air is mixed with fuel and burned, and the expanding hot combustion gases are directed against stationary turbine vanes in the engine. The vanes turn the high velocity gas flow partially sideways to impinge onto turbine blades mounted on a rotatable turbine disk. The force of the impinging gas causes the turbine disk to spin at high speed. Jet propulsion engines use the power created by the rotating turbine disk to draw more air into the engine, and the high velocity combustion gas is passed out of the gas turbine aft end to create forward thrust. Other engines use this power to turn one or more propellers, electrical generators, or other devices.

Both airfoils and combustors made from silicon nitride or silicon carbide have the potential to appreciably increase the operating temperatures of turbine engines. The high temperature and high pressure environment of the turbine engine as well as the high gas velocity can cause erosion of silicon based ceramics. The mechanism of some of the erosion loss is due to the formation of $SiO_2$ and SiO gas. Typically, combustion gas environments, including turbine engines, contain about 10% water vapor. Oxygen containing water in the turbine reacts with silicon nitride and silicon carbide to form silica scale on silicon based ceramic surfaces. Water vapor can also react with the silica scale to form silicon hydroxide, which is volatile. Evaporation of silicon hydroxide from ceramic surfaces and erosion of ceramic caused by high speed combustion gases passing over ceramic surfaces leads to the loss of ceramic material from ceramic combustor and turbine components at rates of a few microns per hour.

U.S. Pat. No. 6,159,553 and US 2002/0136835 A1 show protective ceramic coatings. Tantalum oxide alloyed with lanthanum oxide provides an environmental coating (EBC). However, tantalum oxide permits diffusion of oxygen, resulting in the formation of a $SiO_2$ layer below the tantalum oxide layer. Published U.S. patent application 2002/0098391 by Tanaka et al discloses the use of rare earth silicates to form a protective coating to a silicon based substrate ceramic material. But the process disclosed by Tanaka limits the coating composition because it allows interaction of the coating with the substrate.

Accordingly, there is a need for an improved coating and method to apply the coating for a high temperature (>2200° F. (>1200° C.)) barrier between an environmental coating and a substrate of silicon nitride or silicon carbide. There is also a need for a diffusion coating that will prevent migration of cations out of a silicon-based substrate. There is as well a need to coat complex parts with a uniform dense oxidation resistant coating at a minimal cost. Furthermore, other desirable features and characteristics of the present invention will become apparent from the subsequent detailed description of the invention and the appended claims, taken in conjunction with the accompanying drawings and this background of the invention.

BRIEF SUMMARY

The present disclosure generally relates to protective coatings for gas turbine engine applications. In one embodiment, an exemplary protective coating system includes a substrate formed of a ceramic matrix composite material. The substrate has an exterior surface exhibiting a degree of valley/hill surface irregularity including a plurality of hills and a plurality of valleys. The protective coating system further includes a first coating layer deposited from a sol-gel material. The first coating layer is formed directly on to the exterior surface of the substrate and conforms to the exterior surface of the substrate such that the first coating layer has a non-uniform coating thickness over the substrate wherein the first coating layer has a thickness within the plurality of valleys that is greater than its thickness over the plurality of hills. The protective coating system further includes a second, porous coating layer formed directly on to the exterior surface of the first coating layer. The second coating layer includes a plurality of pores within the second coating layer. Still further, the protective coating system includes a third coating layer partially formed directly on to an exterior surface of the second coating layer and partially formed within at least some of the plurality of pores within the second coating layer. The third coating layer coats walls of at least some of the plurality of pores but does not completely fill the at least some of the plurality of pores.

In another embodiment, a protective coating system includes a substrate that has an exterior surface exhibiting a degree of valley/hill surface irregularity including a plurality of hills and a plurality of valleys and a first coating layer formed directly on to the exterior surface of the substrate and that conforms to the exterior surface of the substrate such that the first coating layer has a non-uniform coating thickness over the substrate. The first coating layer has a thickness within the plurality of valleys that is greater than its thickness over the plurality of hills. The protective coating system further includes a second coating layer formed directly on to the exterior surface of the first coating layer. The second coating layer includes a plurality of pores within the second coating layer. Still further, the protective coating system includes a third coating layer formed within at least some of the plurality of pores within the second coating layer. The third coating layer coats walls of at least some of the plurality of pores but does not completely fill the at least some of the plurality of pores.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present invention will hereinafter be described in conjunction with the following drawing figures, wherein like numerals denote like elements, and wherein:

FIGS. 2-6 illustrate, in cross section, coated turbine engine components and methods for fabricating coated turbine engine components in accordance with various embodiments of the present disclosure.

DETAILED DESCRIPTION

Figure 1:
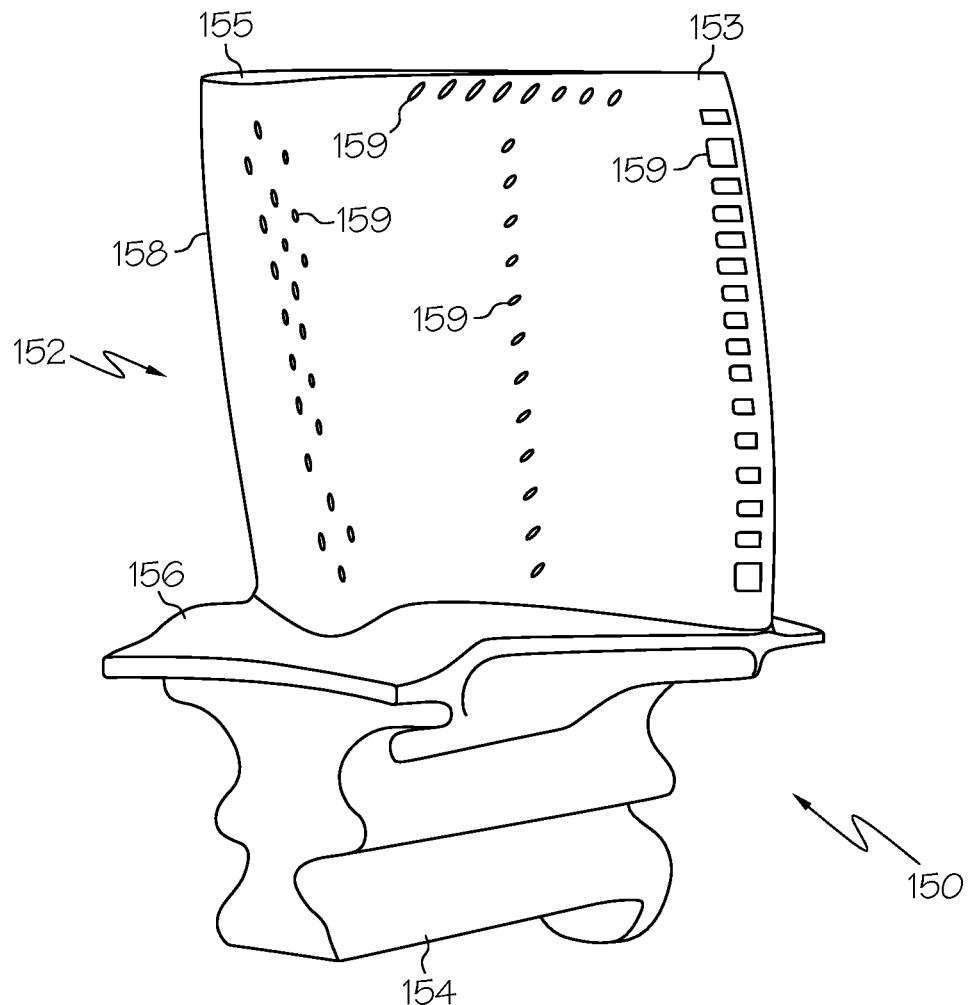
FIG. 1 is an exemplary ceramic matrix composite turbine blade suitable for use in a gas turbine engine and upon which the coatings of the present disclosure may be applied.

The following detailed description of the invention is merely exemplary in nature and is not intended to limit the invention or the application and uses of the invention. Furthermore, there is no intention to be bound by any theory presented in the preceding background of the invention or the following detailed description of the invention.

Silicon carbide-silicon carbide matrix ("SiC-SiC") materials are currently limited in operational use temperature by oxidation which begins around 2400° F., or even lower in some instances. While there are many coating methods that have been put forth, all claiming to resolve the issues of other methods, they each have issues of their own. In other words, gaining a benefit in a property from one process or material often leads to a shortfall in another property. The present disclosure provides a hybrid approach to creating an oxidation/thermal barrier for SiC-SiC substrate materials to allow the use temperature to be increased from about 2400° F. to about 3000° F. The hybrid approach employs three or more layers each made using a different process/composition/microstructure. The process for applying each layer, as well as the type/composition of each layer, are such that its strong points compliment the shortfalls of the others while creating a robust coating.

In broad terms, with reference to the practice of the present embodiments, a SiC—SiC substrate is appropriately cleaned/heat treated for a coating to be applied. First, a thin layer is applied to the substrate with the intent to create an oxygen barrier on the surface, and to decrease the surface roughness, enhance bonding, and/or provide compliance. The nature of the SiC-SiC substrate is such that the surface has many valleys and hills, as well as pits up to about 30 mil to about 50 mil deep. A low viscosity process such as sol-gel is used to preferentially fill in the valleys while putting a thinner layer on the hills. Materials such as yttria-silicate and zirconia-silicate, for example, may be used for this first layer. Additionally, materials including an element selected from the group consisting of aluminum, zirconium, titanium, yttrium, hafnium, tantalum may be employed. Further, silicates of any of the foregoing may be employed. After processing of the first layer, a second layer is applied. This second layer is thicker and may have some porosity. One of the purposes of the second layer is as a thermal barrier, with the goal of adding about 100 to about 600° F. to the operating temperature of the substrate material. The second layer may be made of an insulating material such as a rare earth silicate material. The thermal gradient created by the thermal barrier layer can be customized by altering its composition, structure, and/or thickness. After processing of the second layer, a third layer is applied. One purpose of the third layer is to fill/partially fill in the porosity of the second layer and/or coat the surface of the second layer, including the walls of the porosity. Application of the third layer may be done via an infiltration process where the layer is drawn into the pores via capillary action or vacuum, or it may be done using a process such as aerosol deposition or other vapor process. In some embodiments, this third layer is not needed or does not need to be infiltrated into the second layer.

Turning now to the Figures, FIG. 1 illustrates a ceramic matrix composite (CMC) blade 150 that is exemplary of the types of components or substrates that are used in turbine engines, although turbine blades commonly have different shapes, dimensions and sizes depending on gas turbine engine models and applications. However, this invention is not restricted to such substrates and may be utilized on many other substrates requiring thermal barrier protection, including other components of gas turbine engines exposed to high temperature gases. As noted above, the blade 150 may be formed of a silicon carbide fiber/silicon carbide matrix composite material. The illustrated blade 150 has an airfoil portion 152 including a pressure surface 153, an attachment or root portion 154, a leading edge 158 including a blade tip 155, and a platform 156. The blade 150 may be formed with a non-illustrated outer shroud attached to the tip 155. The blade 150 may have non-illustrated internal air-cooling passages that remove heat from the turbine airfoil. After the internal air has absorbed heat from the SiC-SiC material, the air is discharged into a combustion gas flow path through passages 159 in the airfoil wall.

As generally known in the art, a SiC-SiC ceramic matrix composite material may include a SiC fiber-bonded ceramic or a SiC fiber-bonded ceramic having a graded structure, for example. Regarding the SiC fiber-bonded ceramic, such a material may generally include inorganic fibers having mainly a sintered SiC structure, each of which contains 0.01-1 wt. % of oxygen (O) and at least one or more metal atoms of metal atoms in Groups 2A, 3A, and 3B, and a 1-100 nm interfacial layer containing carbon (C) as a main component formed between the fibers. Further, the SiC fiber-bonded ceramic having a graded structure may generally include a matrix, the matrix including inorganic fibers having mainly a sintered SiC structure containing 0.01-1 wt. % of oxygen (O) and at least one or more metal atoms of metal atoms in Groups 2A, 3A, and 3B, and a 1-100 nm interfacial layer containing carbon (C) as a main component formed between the fibers, a surface portion having a ceramic structure including mainly SiC and being formed on at least part of the surface of the matrix, a boundary portion interposed between the surface portion and the matrix and having a graded structure that changes from the structure of the matrix to the structure of the surface portion gradually and continuously.

These SiC-SiC materials include a volume fraction of about 90% or more of SiC-based fibers. Such materials have high fracture toughness and are insensitive to defects. The fiber material constituting the SiC fiber-bonded ceramic is mainly inorganic fibers that include a sintering structure containing mainly SiC, contain about 0.01-1 wt. % of oxygen (O) and at least one metal atom selected from the group including metal atoms in Groups 2A, 3A, and 3B, and are bonded very close to the closest-packed structure. The inorganic fibers including a sintered SiC structure include mainly a sintered polycrystalline n-SiC structure, or include crystalline particulates of β-SiC and C. In a region containing a fine crystal of carbon (C) and/or an extremely small amount of oxygen (O), where β-SiC crystal grains sinter together without grain boundary second phase interposed therebetween, a strong bond between SiC crystals can be obtained.

Figure 2:
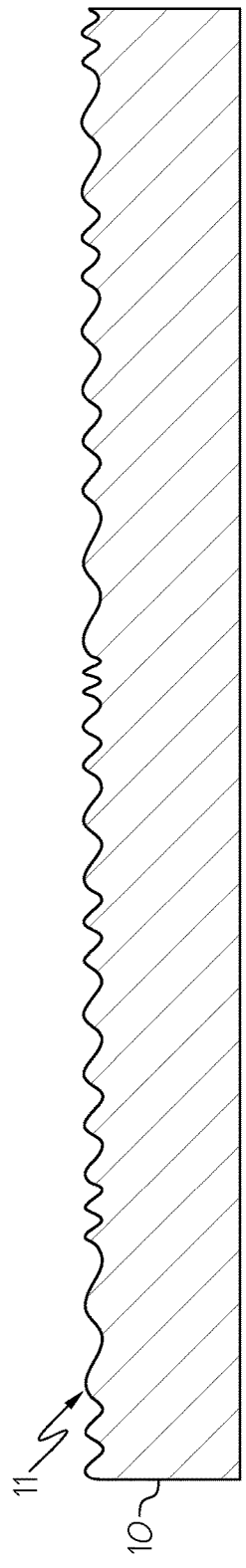

FIGS. 2-6 illustrate, in cross section, coated turbine engine components and methods for fabricating coated turbine engine components in accordance with various embodiments of the present disclosure. FIG. 2 is a cross-sectional view of a substrate 10 formed of a SiC-SiC material as described above upon which is to be disposed a protective coating system in accordance with an exemplary embodiment of the present disclosure. The substrate 10 may be employed for use in, for example, the fabrication of a turbine blade such as turbine blade 150 of FIG. 1. As shown in FIG. 2, the substrate 10 has a generally irregular or "wavy" outer surface 11, including "pits" and "valleys," upon which the protective coating system is to be disposed, and which may be formed by the woven fibers of the ceramic matrix composite. The irregular surface includes deviations (+/−) from planar of several mils, such as about 1 mil to about 5 mils. The outer surface 11 may also have larger defects beyond the illustrated irregular surface. These larger defects may include deviations from planarity of about 30 mils to about 50 mils or greater, in some instances.

Figure 3:
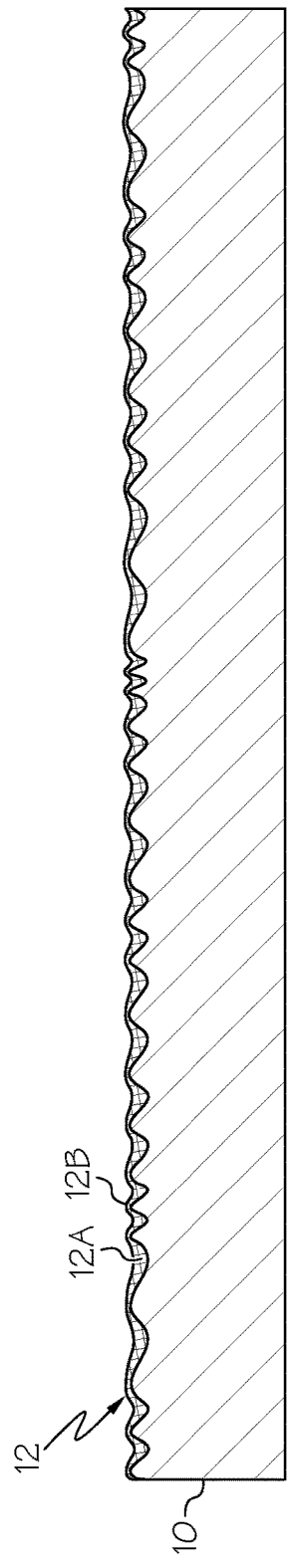

With reference now to FIG. 3, to the outer surface 11 of the substrate 10 is applied a first coating layer 12 that is provided in order to fill-in the pits and valleys, thereby minimizing the irregularity of the outer surface 11. The first coating layer 12 is also provided as an oxygen barrier between the substrate 10 and the surrounding environment. Still further, the first coating layer 12 may have the additional properties of promoting a bond between the substrate 10 and subsequently-deposited layers, and a compliance layer for any possible mis-match between the coefficient of thermal expansion (CTE) of the substrate 10 and subsequently-deposited layers. According to an exemplary embodiment, various sol gel coatings may be provided as the first coating layer 12. In a typical sol-gel process, the precursor is subjected to a series of hydrolysis and polymerization reactions to form a colloidal suspension. Once this occurs, the particles condense in a new phase, the gel, in which a solid macromolecule is immersed in a solvent. A variety of sol gels are known and a wide range of these may be used in embodiments of the present coatings. For example, useful sol gels may include, without limitation, sol gels of aluminum, zirconium, titanium, yttrium, hafnium, tantalum, and the like. Particularly, these metals, or the silicates of these metals, are suitable for use herein, as they provide excellent oxygen barrier properties. Exemplary embodiments of barrier coatings may be formed from layered sol gel coatings that include two or more coating layers formed one above the other. Each of the sol gel coating layers may be formed from the same sol gel, or some of the coating layers may be formed of a different sol gel.

In general the sol gel single coatings of first coating layer 12 are thin, typically less than about 5 mils, such as less than about 3 mils. But multiple layers, each of the same or a different chemistry, may build up the total thickness of the sol gel barrier coating to about 20 mils. The sol gel barrier coating may have a non-uniform coating thickness so as to fill in the pits, valleys, and any defects. For example, as shown in FIG. 3, the thickness of coating layer 12 in region 12A, which is a pit/valley region, is thicker than the thickness of coating layer 12 in region 12B, which is a "hill" region (between valleys).

According to exemplary embodiments, sol gels may be applied to the surfaces of a substrate by any of several techniques. For example, thin films of liquid sol gel can be applied to a portion of a substrate by spin-coating or dip-coating. Other methods include spraying, or roll coating.

Figure 4:
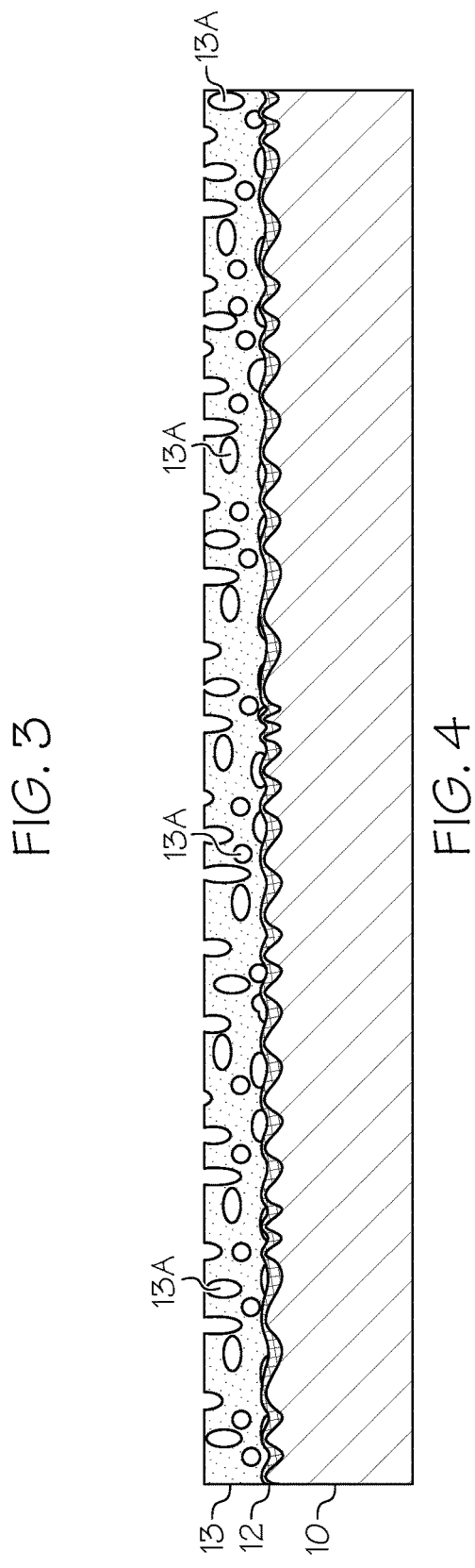

Referring now to FIG. 4, disposed over the first coating layer 12 is a second coating layer 13. Second coating layer 13 is formed thicker than first coating layer 12. For example, second coating layer 13 may be formed to a thickness from 10 mils to about 100 mils, for example from about 20 mils to about 50 mils. The second coating layer is provided as a thermal barrier coating to enhance the operating capabilities of a gas turbine engine component fabricated with the SiC-SiC substrate as described above. For example, in one embodiment, the second coating layer is provided to a sufficient thickness such that an additional about 100 to about 600° F. of operating temperature is gained by the deposition thereof (that is, the component is safely able to operate at temperatures of about 300° F. higher (or more) than it otherwise would). In particular embodiments, the addition of second coating layer 13 raises the suitable operating temperature of a component formed with substrate 10 from about 2400° F. to about 2700° F. or greater, such as about 3000° F. or greater.

The second coating layer 13 may generally include a rare-earth silicate material. Alternatively, aluminates, phosphates, and zirconates of the rare earth elements may be used. As known in the art, rare earth elements include, among various others, strontium, lanthanum, yttrium, scandium, and others. For some embodiments, silicate of yttrium and scandium are particularly suitable. The second coating layer may be applied over the first coating layer using any known methods. These methods include, but are not limited to, plasma spraying, physical vapor deposition (PVD), and electron beam physical vapor deposition (EB-PVD), and dipping.

The material used for the second coating layer 13 and the method of application thereof is selected such that the second coating layer 13 has a porosity, as indicated by pores 13A. The pores 13A may be of various shapes and sizes, as is known in the art. In some embodiments, the porosity of second coating layer 13 may be from about 10% to about 70% (the percentage indicates the amount, by volume, of void space as a result of the presence of pores 13A in layer 13). In other embodiments, the porosity may be from about 25% to about 50%. The number and distribution of pores may be substantially equivalent throughout the thickness of layer 13. In other embodiments, deposition of second coating layer 13 may be provided such that there is a porosity gradient within layer 13. For example, a greater or lesser degree of porosity may be provided in areas of layer 13 that are relative closer to layer 12, whereas a lesser or greater degree of porosity may be provided in areas of layer 13 that are relatively further from layer 12. As known in the art, greater porosity provides greater thermal barrier capabilities, but renders the material less stable. Higher porosity will also likely compromise the mechanical properties of the coating. As such, in one embodiment, a relatively lesser porosity (for example from about 10% to about 40%) is provided in areas of layer 13 that are relatively closer to layer 12, and a relatively greater porosity (for example from about 40% to about 70%) is provided in areas of layer 13 that are relatively further from layer 12.

The description of the exemplary method and coating continues with reference to FIG. 5, which illustrates the optional deposition of a third coating layer 14. Optional third coating layer 14 may be provided to fill in the porosity of the second layer and/or coat the surface of the second layer, including the walls of the porosity, or wholly/partially remain on the surface. The third coating layer 14 may include, without limitation, materials including aluminum, zirconium, titanium, yttrium, hafnium, tantalum, and the like. Particularly, the silicates, metallic, and phosphates of these metals are suitable for use herein.

FIG. 5 illustrates the third coating layer 14 deposited on top of the second coating layer 13. The layer 14 may be deposited to a thickness 14A that is suitable to achieve the desired infiltration and fill of the porosity of layer 13, as will be described in greater detail below. The third coating layer 14 may be deposited by any of the above-described methods, such as spin-coating, dip-coating, spraying, roll coating, plasma spraying, PVD, EB-PVD, and others.

Referring now to FIG. 6, the layer 14 is caused to be infiltrated into the porosity of the second layer 13. The embodiment shown in FIG. 6 illustrates the material of layer 14 filling or at least coating all of the pores 13A in layer 13. However, in some embodiments, such complete infiltration may not be possible or desired. For example, in embodiments wherein there is a gradient in pore size, with smaller pores being located near layer 12, the material of layer 14 may only infiltrate a certain portion of the depth of layer 13 (namely into the pores 13A thereof. For example, in some embodiments, the material of layer 14 may infiltrate 70% or less of the thickness of layer 13, 50% of the thickness or less, or even 30% of the thickness or less. The amount of material of layer 14 deposited thus depends on the thickness and desired fill properties of layer 13. For example, where complete fill of all pores 13A in the layer 13 is desired, a greater thickness of layer 14 will be deposited. In a further example, where it may be only desirable to coat the walls of some of the pore 13A (i.e., not completely fill) of second coating layer 13, a lesser thickness of layer 14 will be deposited. Exact thickness for a given embodiment will ultimately be determined by the skilled artisan, but may generally be from about 5 mils to about 20 mils, as initially deposited (FIG. 5).

Infiltration of the material of layer 14 into the layer 13 may be accomplished in a variety of manners, including for example capillary action or an applied vacuum. In alternative embodiments, infiltration of layer 13 may be accomplished using a process such as aerosol deposition or other vapor process. In some embodiments, the above-described porosity gradient may be accomplished on the basis of how the infiltrant is processed, namely its quantity, the vacuum conditions, the temperature, its viscosity, and the method of infiltration, among other considerations. The infiltration can be performed in the green/wet/gaseous state, or it can be done during high temperature processing. Upon infiltration of the material of layer 14 into layer 13, the thickness of layer 14 over layer 13 is substantially reduced, as indicated by reference numeral 14B. For example, in some embodiments, the final thickness of layer 14, after infiltration is performed, may be less than 5 mils, less than 3 mils, or less than 1 mil.

The coating system generally indicated in FIG. 6 by reference numeral 15 is thus the protective coating formed according to the teachings of the present disclosure. Accordingly, protective coating systems for gas turbine engine applications and methods for fabricating such protective coating systems have been provided. The disclosed embodiments beneficially provide a hybrid approach to creating an oxidation barrier for SiC-SiC substrate materials to allow the use temperature to be increased from about 2400° F. to about 3000° F.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A protective coating system comprising:
  a substrate formed of a ceramic matrix composite material, wherein the ceramic matrix composite material is a silicon carbide-silicon carbide (SiC-SiC) material, which includes a volume fraction of about 90% or more of SiC-based fibers; wherein the substrate has an exterior surface exhibiting a degree of valley/hill surface irregularity comprising a plurality of hills and a plurality of valleys;
  a first coating layer deposited from a sol-gel material, wherein the first coating layer is formed directly on to the exterior surface of the substrate and conforms to the exterior surface of the substrate such that the first coating layer has a non-uniform coating thickness over the substrate wherein the first coating layer has a thickness within the plurality of valleys that is greater than its thickness over the plurality of hills;
  a second, thermal barrier, porous coating layer formed directly on to the exterior surface of the first coating layer, wherein the second coating layer comprises a plurality of pores within the second coating layer, where the pores are at the surface and extending below the surface through various shapes and sizes; and
  a third coating layer partially formed directly on to an exterior surface of the second coating layer and partially formed within at least some of the plurality of pores within the second coating layer, wherein the third coating layer coats walls of at least some of the plurality of pores but does not completely fill the at least some of the plurality of pores,
  wherein:
    there is a porosity gradient within the second coating layer, and
    the porosity gradient is characterized by a relatively lesser degree of porosity adjacent to the exterior surface of the first coating layer and a relatively greater degree of porosity adjacent to the exterior surface of the second coating layer.

2. The protective coating system of claim 1, wherein the first coating layer comprises a material including an element chosen from: aluminum, zirconium, titanium, yttrium, hafnium, and tantalum.

3. The protective coating system of claim 2, wherein the first coating layer is a metal silicate.

4. The protective coating system of claim 1, wherein the first coating layer has a variable thickness across the substrate of less than about 10 mils.

5. The protective coating system of claim 1, wherein the second coating layer comprises a rare earth material.

6. The protective coating system of claim 5, wherein the second coating layer consists of a silicate, aluminate, phosphate, or zirconate of a rare earth material.

7. The protective coating system of claim 1, wherein the second coating layer has a thickness of about 10 mils to about 100 mils.

8. The protective coating system of claim 1, wherein the third coating layer is chosen from: silicates, and phosphates of aluminum, silicon, zirconium, titanium, yttrium, hafnium, and tantalum.

9. The protective coating system of claim 1, wherein the first coating layer comprises a metal silicate material including a metal element chosen from: aluminum, zirconium, titanium, yttrium, hafnium, and tantalum; wherein the second coating layer comprises a material that is chosen from: silicates, aluminates, phosphates, or zirconates of a rare earth material; and wherein the third coating layer comprises a material that is chosen from: silicates and phosphates of aluminum, silicon, zirconium, titanium, yttrium, hafnium, and tantalum.

10. The protective coating system of claim 1, wherein the second coating layer comprises a porosity of about 10% to about 70%.

11. The protective coating system of claim 1, wherein the third coating layer infiltrates the second coating layer to a depth of about 70% or less of a total thickness of the second coating layer.

12. The protective coating system of claim 1, wherein the third coating layer creates a porosity gradient in the second coating layer.

13. The protective coating system of claim 1, wherein about 30% or more of the total thickness of the second coating layer comprises pores that remain uncoated with the third coating layer.

14. The protective coating system of claim 1, wherein the first coating layer is characterized as an oxygen barrier material, a compliance material, and/or a bonding material.

15. The protective coating system of claim 1, wherein the second coating layer is characterized as a thermal barrier material.

16. A turbine blade comprising the protective coating system of claim 1.

17. A protective coating system comprising:
a substrate that has an exterior surface exhibiting a degree of valley/hill surface irregularity comprising a plurality of hills and a plurality of valleys;
a first coating layer formed directly on to the exterior surface of the substrate and that conforms to the exterior surface of the substrate such that the first coating layer has a non-uniform coating thickness over the substrate wherein the first coating layer has a thickness within the plurality of valleys that is greater than its thickness over the plurality of hills;
a second, thermal barrier, coating layer formed directly on to the exterior surface of the first coating layer, wherein the second coating layer comprises a plurality of pores within the second coating layer, where the pores are at the surface and extending below the surface through various shapes and sizes; and
a third coating layer formed within at least some of the plurality of pores within the second coating layer, wherein the third coating layer coats walls of at least some of the plurality of pores but does not completely fill the at least some of the plurality of pores,
wherein:
there is a porosity gradient within the second coating layer, and
the porosity gradient is characterized by a relatively lesser degree of porosity adjacent to the exterior surface of the first coating layer and a relatively greater degree of porosity adjacent to the exterior surface of the second coating layer.

18. The protective coating system of claim 17, wherein the third coating layer is further formed directly on to an exterior surface of the second coating layer.

* * * * *